United States Patent
Heishi et al.

(10) Patent No.: US 9,985,319 B2
(45) Date of Patent: May 29, 2018

(54) METHOD FOR PRODUCING LAMINATE BATTERY, APPARATUS FOR PRODUCING LAMINATE BATTERY, AND LAMINATE BATTERY

(71) Applicant: SEKISUI CHEMICAL CO., LTD., Osaka (JP)

(72) Inventors: Masaru Heishi, Tsukuba (JP); Masashi Kanoh, Tsukuba (JP); Mitsuhide Nogami, Tsukuba (JP); Hiroshi Ogawa, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 373 days.

(21) Appl. No.: 14/889,937

(22) PCT Filed: Nov. 25, 2014

(86) PCT No.: PCT/JP2014/081040
§ 371 (c)(1),
(2) Date: Nov. 9, 2015

(87) PCT Pub. No.: WO2015/076404
PCT Pub. Date: May 28, 2015

(65) Prior Publication Data
US 2016/0126596 A1     May 5, 2016

(30) Foreign Application Priority Data
Nov. 25, 2013    (JP) .................................. 2013-243191

(51) Int. Cl.
*H01M 10/0585* (2010.01)
*H01M 2/26* (2006.01)
(Continued)

(52) U.S. Cl.
CPC ....... *H01M 10/0585* (2013.01); *H01M 2/021* (2013.01); *H01M 2/0212* (2013.01);
(Continued)

(58) Field of Classification Search
CPC ......................... H01M 2/021; H01M 10/0585
(Continued)

(56) References Cited

U.S. PATENT DOCUMENTS

| | | | |
|---|---|---|---|
| 2004/0175611 A1* | 9/2004 | Otohata | H01M 2/021 429/127 |
| 2011/0117417 A1 | 5/2011 | Pitts | |

(Continued)

FOREIGN PATENT DOCUMENTS

| | | |
|---|---|---|
| CN | 1841606 | 10/2006 |
| CN | 102306735 | 1/2012 |

(Continued)

OTHER PUBLICATIONS

International Search Report issued in PCT/JP2014/081040, dated Feb. 10, 2015.
(Continued)

*Primary Examiner* — Basia Ridley
*Assistant Examiner* — James Erwin
(74) *Attorney, Agent, or Firm* — Greenblum & Bernstein, P.L.C.

(57) ABSTRACT

A method for producing a laminate battery includes: forming a membrane electrode assembly having a multilayer structure including a positive electrode plate, a negative electrode plate and an electrolyte layer, the electrolyte layer being provided between the positive electrode plate and the negative electrode plate, a tab attachment step including joining terminal tabs to end portions of the positive electrode plate and the negative electrode plate of the membrane electrode assembly on an outer packaging material, and covering the
(Continued)

membrane electrode assembly with the outer packaging material. Each terminal tab is joined by bending at least a part of the end portion of the outer packaging material in a direction opposite to the membrane electrode assembly, and then joining the terminal tab to the positive electrode plate or the negative electrode plate at a portion corresponding to the bent part of the end portion of the outer packaging material.

11 Claims, 6 Drawing Sheets

(51) Int. Cl.
    *H01M 2/30*     (2006.01)
    *H01M 10/0565*     (2010.01)
    *H01M 2/02*     (2006.01)
    *H01M 2/06*     (2006.01)
    *H01M 10/04*     (2006.01)
    *H01M 4/04*     (2006.01)
    *H01M 10/052*     (2010.01)

(52) U.S. Cl.
    CPC ........... *H01M 2/0267* (2013.01); *H01M 2/06* (2013.01); *H01M 2/26* (2013.01); *H01M 2/30* (2013.01); *H01M 10/0404* (2013.01); *H01M 10/0565* (2013.01); *H01M 4/0407* (2013.01); *H01M 4/0409* (2013.01); *H01M 10/052* (2013.01)

(58) Field of Classification Search
    USPC ........................................................ 429/162
    See application file for complete search history.

(56) References Cited

U.S. PATENT DOCUMENTS

2013/0000110 A1     1/2013   Takeda et al.
2013/0288104 A1*   10/2013   Kang .................... H01M 2/021
                                                                                                    429/153

FOREIGN PATENT DOCUMENTS

| CN | 102687333 | 9/2012 |
|---|---|---|
| JP | 2006-054152 | 2/2006 |
| JP | 2011-513895 | 4/2011 |
| JP | 2012-156128 | 8/2012 |
| JP | 2013-171618 | 9/2013 |
| JP | 2014-060141 | 4/2014 |
| WO | 2009/108185 | 9/2009 |
| WO | 2012/077707 | 6/2012 |
| WO | 2013/027306 | 2/2013 |

OTHER PUBLICATIONS

Japanese Search Report issued in JP 2015-542886, dated Oct. 27, 2015.
Japanese Office Action issued in JP 2015-542886, dated Oct. 27, 2015 w/English language translation.
Office Action issued in China Counterpart Patent Appl. No. 201480033408.7, dated Jan. 24, 2017 , along with an English translation thereof.

* cited by examiner

METHOD FOR PRODUCING LAMINATE BATTERY, APPARATUS FOR PRODUCING LAMINATE BATTERY, AND LAMINATE BATTERY

TECHNICAL FIELD

The present invention relates to a method for producing a laminate battery used for a lithium ion secondary battery and the like, an apparatus for producing the same, and a laminate battery produced by the method or the apparatus.

Priority is claimed on Japanese Patent Application No. 2013-243191, filed Nov. 25, 2013, the contents of which are incorporated herein by reference.

BACKGROUND ART

A lithium ion secondary battery has characteristic high energy density and electromotive power as compared to a lead storage battery or a nickel-hydrogen battery; therefore, a lithium ion battery has been widely used as a power supply for various portable devices which are demanded to be smaller in size and lighter in weight, and laptop computers. Such a lithium ion secondary battery is generally produced by a method in which a positive electrode plate formed of a positive electrode current collector coated with a positive electrode active material and a negative electrode plate formed of a negative electrode current collector coated with a negative electrode active material are laminated through a separator provided therebetween, and the resultant laminate of the positive electrode plate, the separator and the negative electrode plate is sealed within a casing together with an electrolytic liquid. Further, a lithium ion secondary battery is generally constructed such that electrode terminals connected respectively to the positive and negative electrode plates of the laminate protrude from the casing (see, for example, Patent Document 1).

The lithium ion secondary battery described in Patent Document 1 has a structure wherein an electrode assembly having a positive electrode with a positive electrode lead, a negative electrode and a separator is accommodated in a laminate casing, and an insulating cover is provided at one or both of a position between the positive electrode lead and the laminate casing and a position between the negative electrode lead and the laminate casing. Further, in the structure of the lithium ion secondary battery of Patent Document 1, the insulating cover is formed by bending an insulating material in a sheet form, whereby the positive electrode lead and the negative electrode lead are also bent accordingly. This structure improves the tightness of seal of the battery while suppressing the damages such as cracks caused to the laminate casing during the sealing under reduced pressure.

PRIOR ART REFERENCES

Patent Document

Patent Document 1; Japanese Unexamined Patent Application Publication No. 2013-171618

DISCLOSURE OF INVENTION

Problems to be Solved by the Invention

Meanwhile, conventionally, an electrolyte using a non-aqueous solvent has been used in a secondary battery, which is sealed within a rigid casing made of a metal; however, recently, for meeting a demand for more compact and thinner batteries and freedom of shape thereof, and for the purpose of improving safety by avoiding leakage of the non-aqueous electrolytic liquid from the battery, a polymer lithium ion secondary battery has been developed, which uses a solid or gel (semi-solid) form of electrolyte. In a method for producing such a secondary battery that has begun to be employed for improving the productivity, for example, a continuous production is performed by respectively feeding a negative electrode plate, a separator and a positive electrode plate which are formed into strips from rolls to extend so as to be laminated one upon another, while coating a gel electrolyte on the negative electrode plate or the separator.

However, in such a method for producing a secondary battery using a gel electrolyte, there is a risk of troubles such as suspension of the continuous production due to the leakage of the gel electrolyte after coating, which adheres to the production line. For preventing such troubles, there is proposed a method in which a secondary battery using a gel electrolyte is produced by coating the gel electrolyte onto a negative electrode plate or a separator while placing an outer casing such as an aluminum laminate sheet at a lower position.

However, when a laminated body is continuously produced while placing the outer casing at a lower position, and then a tab as an electrode terminal is attached to the positive or negative electrode plate by, for example, ultrasonic welding or resistance welding, the processing is performed with the outer casing being present directly below the laminated body; therefore, through-holes are caused to be formed in the outer casing by ultrasonic energy or the like during the welding of the tab to the positive electrode plate or the negative electrode plate. This causes a problem that it becomes difficult to produce a secondary battery using a gel electrolyte by a continuous production process as mentioned above.

The present invention has been made in view of the aforementioned problems, and the purposes of the present invention are to provide: a method and an apparatus for producing a laminate battery which enables to attach tabs to the positive and negative electrodes without forming through-holes in the outer casing and to produce a laminate battery continuously; and a laminate battery produced by the same.

Means to Solve the Problems

The invention of claim 1 is a method for producing a laminate battery, comprising: a step of forming a membrane electrode assembly having a multilayer structure comprising a positive electrode plate, a negative electrode plate and an electrolyte layer, the electrolyte layer being provided between the positive electrode plate and the negative electrode plate; a tab attachment step comprising joining terminal tabs to end portions of the positive electrode plate and the negative electrode plate of the membrane electrode assembly on an outer packaging material; and a step of covering the membrane electrode assembly with the outer packaging material, wherein each of the terminal tabs is joined by bending at least a part of the end portion of the outer packaging material in a direction opposite to the membrane electrode assembly, and then joining the terminal tab to the positive electrode plate or the negative electrode plate at a portion thereof corresponding to the bent part of the end portion of the outer packaging material.

By the present invention, since the terminal tabs are joined to end portions of the positive electrode plate and the negative electrode plate with the outer packaging material being bent in advance in a direction opposite to the membrane electrode assembly, the terminal tabs can be easily joined to the positive electrode plate and the negative electrode plate without occurrence of through-holes in the outer packaging material.

The invention of claim 2 is the method for producing a laminate battery according to claim 1, wherein the membrane electrode assembly further comprises a separator provided between the positive electrode plate and the negative electrode plate, and the electrolyte layer is in the form of a gel.

Even in the case of production of a laminate battery having a membrane electrode assembly with such a construction, the same excellent effect as mentioned above in connection with claim 1 can be obtained.

The invention of claim 3 is a method for producing a laminate battery according to claim 1, which further comprises the following steps prior to the tab attachment step: a laminating step for forming the membrane electrode assembly, which comprises: feeding one electrode plate selected from the positive electrode plate and the negative electrode plate which are formed into strips onto the outer packaging material formed into a strip such that the electrode plate extends on the outer packaging material; feeding the separator formed into a strip onto a surface of said one electrode plate such that the separator extends on said one electrode plate; and feeding another electrode plate onto a surface of the separator such that said another electrode plate extends on the separator, to thereby laminating the electrode plates through the separator, wherein a gel electrolyte is applied onto a surface of one of the positive electrode plate and the negative electrode plate, or a surface of the separator, such that gel electrolyte layer in a strip form is laminated in the resulting membrane electrode assembly, and a subsequent dividing step comprising cutting a strip-form laminate of the outer packaging material and the membrane electrode assembly, to thereby divide the laminate into pieces having an approximately rectangular shape as viewed in plan.

By this invention, since the gel electrolyte layer is formed by applying the gel electrolyte onto the surface of the electrode plate or the separator extending on the outer packaging material, the gel electrolyte layer can be continuously formed easily within a short period of time without leakage of the gel electrolyte.

The invention of claim 4 is the method according to any one of claims 1 to 3, which further comprises a laminate-sealing step subsequent to the tab attachment step, the laminate-sealing step comprising bending the bent part of the end portion of the outer packaging material back to the side of the membrane electrode assembly; packaging the membrane electrode assembly with the outer packaging material with the terminal tabs protruding out of the outer packaging material; and sealing the outer packaging material at its outer periphery.

By the method of this invention, the bent part of the end portion of the outer packaging material is bent back to the side of the membrane electrode assembly, and then the membrane electrode assembly is packaged with the outer packaging material with the terminal tabs protruding out of the outer packaging material, followed by sealing the outer packaging material at its outer periphery; therefore, it becomes possible to produce a laminate battery which can surely secure an electrical connection of the terminal tabs with the outside, and has a tightly sealed structure.

The invention of claim 5 is the method according to any one of claims 1 to 4, wherein, in the tab attachment step, the joining of the terminal tabs to the end portions of the positive electrode plate and the negative electrode plate is performed by a method selected from the group consisting of ultrasonic welding, resistance welding and laser welding.

By this invention, since the joining of the terminal tabs to the positive electrode plate and the negative electrode plate is performed by ultrasonic welding, resistance welding or laser welding, a strong connection can be achieved at the joints using a simple method with a compact apparatus.

The invention of claim 6 is a method wherein, in the tab attachment step, the terminal tabs are contacted with and joined to the end portions of the positive electrode plate and the negative electrode plate in the presence of an electrolyte between the terminal tabs and the end portions of the positive electrode plate and the negative electrode plate.

By this invention, even when an electrolyte is present between the terminal tabs and the end portions of the positive electrode plate and the negative electrode plate, the terminal tabs can be easily joined to the positive electrode plate and the negative electrode plate.

The invention of claim 7 is the method according to any one of claims 1 to 6, wherein the outer packaging material is made of aluminum or a stainless steel.

By this invention, since the outer packaging material made of aluminum or a stainless steel is used, the function to protect the membrane electrode assembly to be covered is increased, and it also becomes possible to improve the processability for bending the outer packaging material in a direction opposite to the membrane electrode assembly, and then bending it back.

The invention of claim 8 is an apparatus for producing a laminate battery comprising a membrane electrode assembly having a multilayer structure with a separator and a gel electrolyte layer which are disposed between a positive electrode plate and a negative electrode plate, the membrane electrode assembly being covered with an outer packaging material from which protrude terminal tabs joined with the positive electrode plate and the negative electrode plate, said apparatus comprising: a laminating means for forming the membrane electrode assembly on the outer packaging material by laminating the electrode plates through the separator and the gel electrolyte layer, which comprises: a first roll mechanism which feeds one electrode plate selected from the positive electrode plate and the negative electrode plate which are strips wound into rolls onto the outer packaging material such that the electrode plate extends on the outer packaging material; a second roll mechanism which feeds the separator which is a strip wound into a roll onto a surface of said one electrode plate such that the separator extends on said one electrode plate; and a third roll mechanism which feeds another electrode plate which is a strip wound into a roll onto a surface of the separator such that said another electrode plate extends on the separator; and a coating mechanism which applies a gel electrolyte onto a surface of one of the positive electrode plate and the negative electrode plate, or a surface of the separator, such that a gel electrolyte layer in a strip form is laminated in the resulting membrane electrode assembly, a dividing means which cuts a strip-form laminate of the outer packaging material and the membrane electrode assembly, to thereby divide the laminate into pieces having an approximately rectangular shape as viewed in plan, a bending means comprising an adsorption mechanism for adsorbing a lateral end portion of the outer packaging material, which adsorbs the lateral end portion of the outer packaging material and bends the lateral end portion in a direction opposite to the membrane electrode assembly, and a welding means which joins terminal tabs to end portions of the positive electrode plate and the negative electrode plate by welding.

By the apparatus of this invention, since the apparatus has the bending means which bends the outer packaging material in a direction opposite to the membrane electrode assembly, and a welding means which joins terminal tabs to end portions of the positive electrode plate and the negative electrode plate by welding, also in this case, the terminal tabs can be easily joined to the positive electrode plate and the negative electrode plate without occurrence of through-holes in the outer packaging material.

Further, by this invention, since the apparatus has a laminating means which forms the gel electrolyte layer by applying the gel electrolyte onto the surface of the electrode plate or the separator extending on the outer packaging material, the gel electrolyte layer can be continuously formed easily within a short period of time without leakage of the gel electrolyte.

The invention of claim 9 is the apparatus according to claim 8, which further comprises a laminate-sealing means comprising a bend-back mechanism which bends the lateral end portion of the outer packaging material bent in a direction opposite to the membrane electrode assembly back to the side of the membrane electrode assembly, and which packages the membrane electrode assembly with the outer packaging material with the terminal tabs protruding out of the outer packaging material and seals the outer packaging material at its outer periphery.

By the apparatus of this invention, since the apparatus has a laminate-sealing means which packages the membrane electrode assembly with the outer packaging material with the terminal tabs protruding out of the outer packaging material and seals the outer packaging material at its outer periphery, it becomes possible to produce a laminate battery which can surely secure an electrical connection of the terminal tabs with the outside, and has a tightly sealed structure.

The invention of claim 10 is the apparatus according to claim 8 or 9, wherein the welding means is selected from the group consisting of a ultrasonic welding means, a resistance welding means and a laser welding means.

By this invention, since the apparatus has the welding means for joining the terminal tabs to the positive electrode plate and the negative electrode plate by ultrasonic welding, resistance welding or laser welding, a strong connection can be achieved at the joints using a simple method with a compact apparatus.

The invention of claim 11 is a laminate battery which is produced by the method according to any one of claims 1 to 7 or the apparatus according to any one of claims 8 to 10.

By this invention, the laminate battery is produced by the method or the apparatus which enables to easily join the terminal tabs to the positive electrode plate and the negative electrode plate without the outer packaging material becoming an obstacle; therefore, the laminate battery can surely secure an electrical connection of the terminal tabs with the outside, and has a tightly sealed structure.

Effect of the Invention

According to the method of the present invention for producing a laminate battery, the following effects can be achieved by the above-mentioned means for solving the problems.

That is, by producing a laminate battery according to the method of the present invention, since the terminal tabs are joined to end portions of the positive electrode plate and the negative electrode plate with the outer packaging material being bent in advance in a direction opposite to the membrane electrode assembly, the terminal tabs can be easily joined to the positive electrode plate and the negative electrode plate, which are included in the membrane electrode assembly placed on the outer packaging material, without occurrence of through-holes in the outer packaging material; therefore, the continuous production of a laminate battery becomes possible, and a laminate battery having excellent properties can be produced with high productivity.

The "membrane electrode assembly" means an assembly formed by laminating at least an electrolyte-containing layer (membrane) and electrodes. The membrane electrode assembly may further comprise other layer(s) between the electrolyte-containing layer and the electrodes.

BEST MODE FOR CARRYING OUT THE INVENTION

Figure 1:
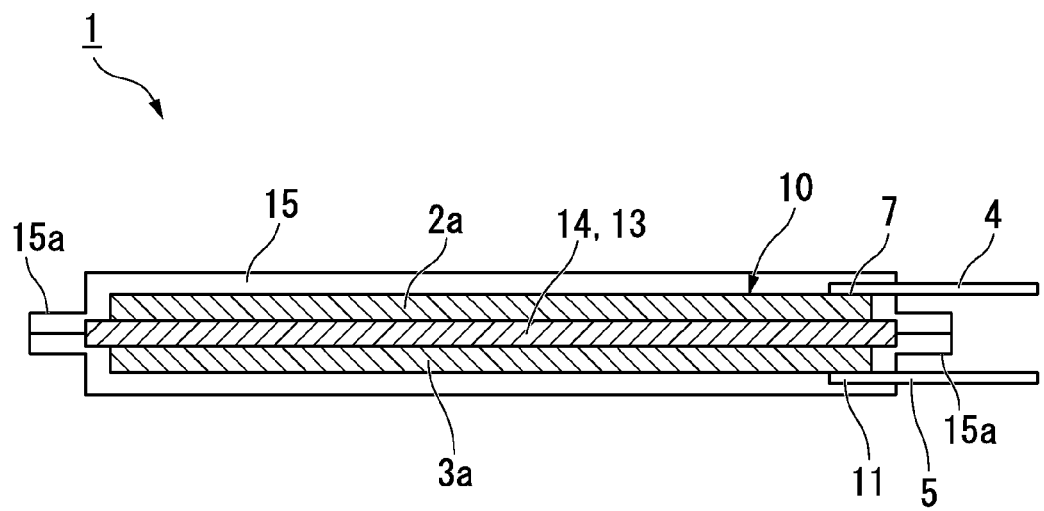
FIG. 1 is a schematic view explanatorily showing an embodiment of the method of the present invention for producing a laminate battery, and is a cross-sectional view of a laminate battery produced by the method, the laminate battery comprising a membrane electrode assembly which has a multi-layer structure and is covered with an outer packaging material.

Hereinbelow, examples are made on embodiments of the method and apparatus of the present invention for producing a laminate battery, and the laminate battery produced thereby, referring to the drawings. The following explanations on the embodiments are made taking a lithium ion secondary battery as an example of the laminate battery.
<Lithium-Ion Secondary Battery (Laminate Battery)>

Figure 2:
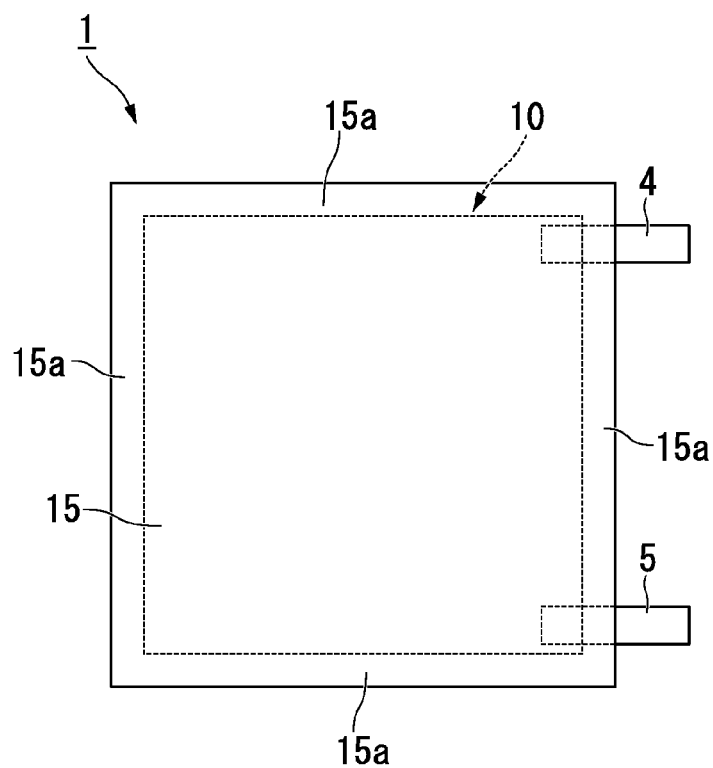
FIG. 2 is a schematic view explanatorily showing an embodiment of the method of the present invention for producing a laminate battery, and is a plan view of the laminate battery shown in FIG. 1.

FIG. 1 is a cross-sectional view of a lithium ion secondary battery (laminate battery) produced according to an embodiment of the method of the present invention, and FIG. 2 is a plan view of the lithium ion secondary battery shown in FIG. 1.

As shown in FIG. 1, the multi-layer membrane electrode assembly 10 provided in the lithium ion secondary battery (laminate type battery) produced by the method of this embodiment is formed by laminating a positive electrode plate (electrode plate) 2a and a negative electrode plate (electrode plate) 3a one upon another, with the terminal tab 4 protruding from the end portion of the positive electrode plate 2a, and the terminal tab 5 protruding from the end portion of the negative electrode plate 3a. Further, the membrane electrode assembly 10 explained in connection with this embodiment has an electrolyte layer (omitted in FIG. 1) formed on the surface of at least one of the positive electrode plate 2a and the negative electrode plate 3a. This electrolyte layer is preferably formed by applying a gel electrolyte on the aforementioned surface of the electrode plate(s).

As shown in FIG. 1 and FIG. 2, the lithium ion secondary battery (laminate battery) 1 produced by the method of this embodiment has a structure in which the multi-layer membrane electrode assembly 10 is packaged with the outer packaging material 15 made of aluminum or the like, and the outer packaging material 15 is sealed at its outer periphery 15a with the terminal tab 4 (connected to the positive electrode plate 2a) and the terminal tab 5 (connected to the negative electrode plate 3a) protruding out of the outer packaging material 15.

Figure 3A:
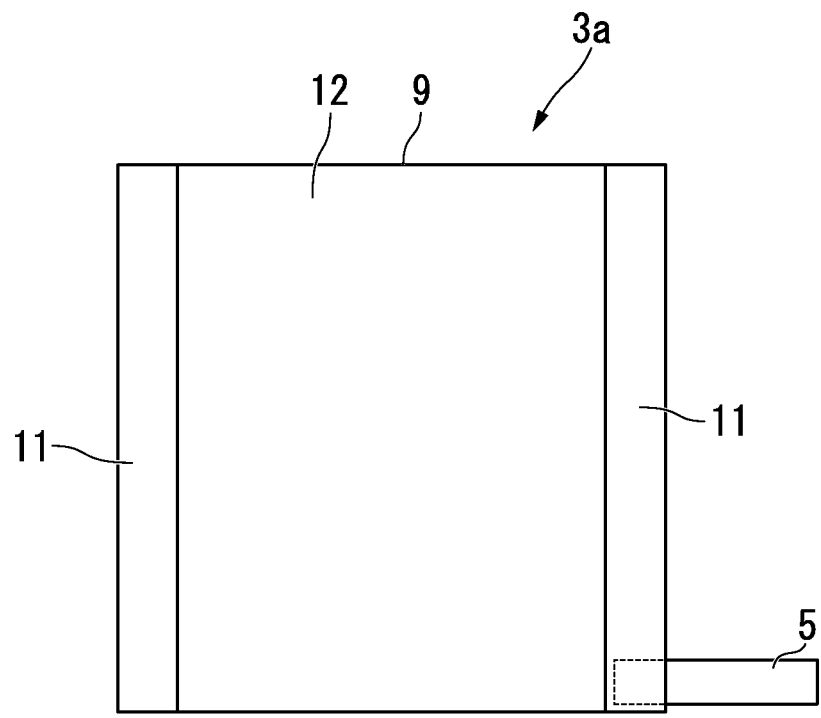
FIG. 3A is a schematic view explanatorily showing an embodiment of the method of the present invention for producing a laminate battery, and is a plan view showing a state wherein a terminal tab is attached to one of the electrode plates of the membrane electrode assembly.
Figure 3B:
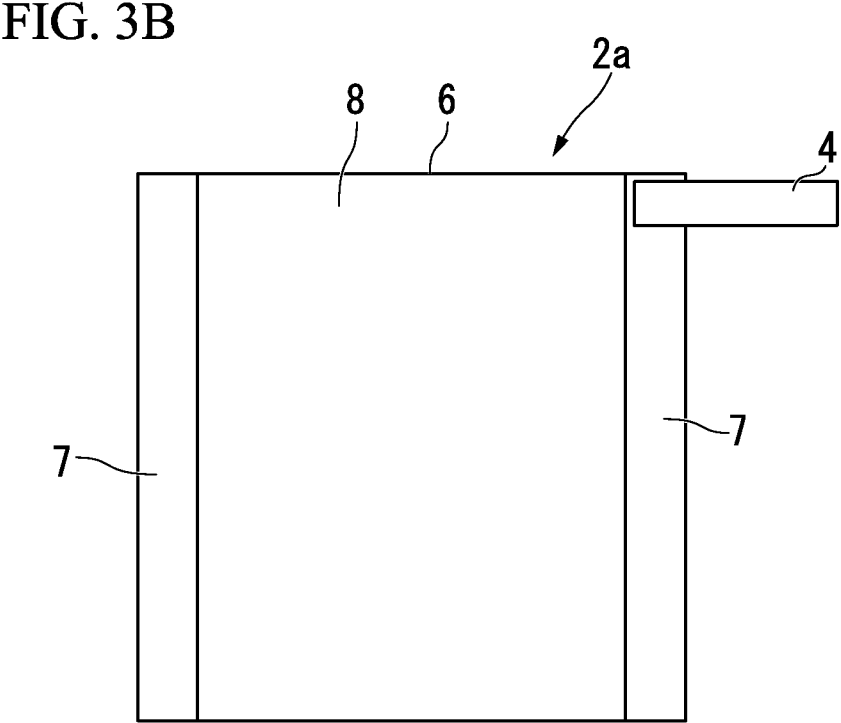
FIG. 3B is a schematic view explanatorily showing an embodiment of the method of the present invention for producing a laminate battery, and is a plan view showing a state wherein a terminal tab is attached to the other one of the electrode plates of the membrane electrode assembly.

As shown in FIG. 3B, the positive electrode plate 2a that is cut out by the method to be described later in detail has a positive electrode active material layer 8 formed on both side of the current collector 6 made of an aluminum foil formed in an approximately rectangular shape in a plan view, excluding the areas of the end portions 7, 7 of the current collector 6. Further, one of the end portions 7, 7 is an area for joining the terminal tab 4.

The positive electrode active material layer 8 is, for example, formed by coating the current collector 6 with a positive electrode slurry in which a positive electrode active material, a conductive auxiliary agent and a binding agent to serve as a binder are dispersed in a solvent. In the example shown in the drawing, the positive electrode slurry is coated on both surfaces of the current collector 6 at a region between the ends 7, 7 of the current collector 6.

The positive electrode active material is not particularly limited and, for example, a metallic lithium compound represented by the general formula $LiM_xO_y$ (wherein M represents a metal, x and y respectively represent ratios of metal M and oxygen O) can be used. Specifically, as the lithium metal oxide compound, it is possible to use lithium cobalt oxide, lithium nickel oxide, lithium manganese oxide, lithium iron phosphate and the like.

As the conductive auxiliary agent in the positive electrode active material layer 8, for example, acetylene black or the like can be used. As the binding agent, for example, polyvinylidene fluoride or the like can be used.

The terminal tab 4 of the positive electrode plate 2a is joined to the end portion 7 of the positive electrode plate 2a so as to protrude outwardly, and is formed, for example, by an aluminum plate or the like.

Further, as shown in FIG. 3A, the negative electrode plate 3a that has been cut out has a negative electrode active material layer 12 formed on both sides of the current collector 9 made of an cupper (Cu) foil formed in an approximately rectangular shape in a plan view, excluding the areas of the end portions 11, 11 of the current collector 9. One of the end portions 11, 11 is an area for joining with the terminal tab 5.

In the example shown in FIG. 1 and FIG. 2, the terminal tab 4 connected to the positive electrode plate 2a and the terminal tab 5 connected to the negative electrode plate 3a are arranged so as to protrude in the same direction from the same end of the membrane electrode assembly 10, that is, the same end of the lithium ion secondary battery 1.

The negative electrode active material layer 12 is, for example, formed by coating the current collector 9 with a negative electrode slurry in which a negative electrode active material, a binding agent to serve as a binder, and, if necessary, a conductive auxiliary agent are dispersed in a solvent. In the example shown in the drawing, the negative electrode slurry is coated on both surfaces of the current collector 9, excluding the areas of the end portions 11, 11 of the current collector 9.

The negative electrode active material is not particularly limited; for example, it is possible to use a carbon material formed of carbon powder, graphite powder or the like, and a metal oxide such as lithium titanate.

As the binding agent, for example, polyvinylidene fluoride or the like can be used. As the conductive auxiliary agent, for example, acetylene black, carbon nanotube or the like can be used.

The terminal tab 5 of the negative electrode plate 3a is joined to the end portion 11 of the negative electrode plate 3a so as to protrude outwardly, and is formed, for example, by a nickel-plated aluminum plate or the like.

The electrolyte layer 13 exemplarily shown in FIG. 1 is, for example, formed of a gel electrolyte 13a coated on both surfaces of a strip-form negative electrode plate 3. In this case, the electrolyte layer 13 is disposed in a gelled form on the surfaces of the negative electrode plate 3. The electrolyte layer 13 may be provided on either one of the surfaces of the strip-formed positive electrode plate 2 and negative electrode plate 3, but is more preferably provided on each of the surfaces of the positive electrode plate 2 and the negative electrode plate 3.

The gel electrolyte 13a is, for example, formed of a polymer matrix and a non-aqueous electrolyte solution (i.e., a non-aqueous solvent and an electrolyte salt), and those which exhibit adhesiveness on their surfaces upon gelation can be used. Alternatively, as the gel electrolyte, it is also possible to use one which comprises a polymer matrix and a non-aqueous solvent, and is solidified after coating to become a solid electrolyte. In the present embodiment, whichever of the aforementioned gel electrolytes is used, the gel electrolyte used exhibits adhesiveness when coated on the positive electrode plate 2 or the negative electrode plate 3. Further, it is more preferred that the gel electrolyte forms a self-supporting film that would not be separated from the surface of the positive electrode plate 2 or the negative electrode plate 3.

As the polymer matrix, for example, it is possible to use a polyester, a polyamine, a polyphosphazene, a polysiloxane and the like as well as a polyvinylidene fluoride (PVDF), polyvinylidene fluoride-hexafluoropropylene copolymer (PVDF-HFP), a polyacrylonitrile, and a polyalkylene ether such as polyethylene oxide or polypropylene oxide.

Examples of the non-aqueous solvent include lactone compounds such as γ-butyrolactone; carbonate ester compounds such as ethylene carbonate, propylene carbonate, dimethyl carbonate, diethyl carbonate, and methyl ethyl carbonate; carboxylic acid ester compounds such as methyl formate, methyl acetate, and methyl propionate; ether compounds such as tetrahydrofuran, and dimethoxyethane; nitrile compounds such as acetonitrile; sulfone compounds such as sulfolane; amide compounds such as dimethylformamide. These compounds can be used individually or as a mixture of two or more types.

When the gel electrolyte is solidified after coating so as to form a solid electrolyte layer as mentioned above, as the non-aqueous solvent, it is possible to use, for example, nitrile compounds such as acetonitrile; ether compounds such as tetrahydrofuran; and amide compounds such as dimethylformamide, which can be used individually or as a mixture of two or more types.

The electrolyte salt is not particularly limited, and it is possible to use lithium salts such as lithium hexafluorophosphate, lithium perchlorate, and lithium tetrafluoroborate.

The material of the separator 14 is not particularly limited, and for example, it is possible to use olefin type materials such as polyethylene and polypropylene, and cellulosic materials. A nonwoven fabric or the like made of any of these materials can be used as the separator 14.

Figure 4A:
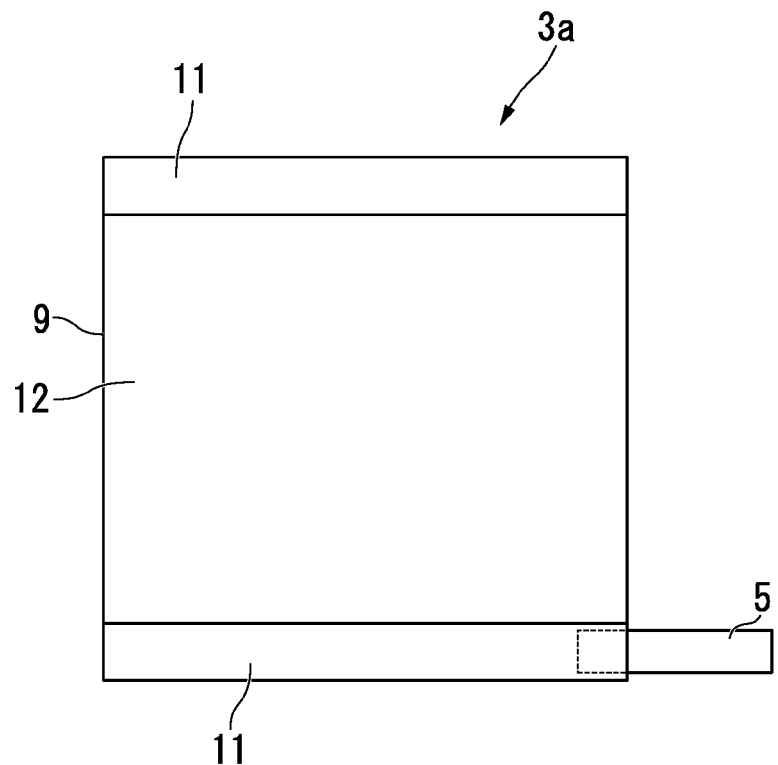
FIG. 4A is a schematic view explanatorily showing an embodiment of the method of the present invention for producing a laminate battery, and is a plan view showing a state wherein the direction of attachment of a terminal tab to one of the electrode plates of the membrane electrode assembly is changed from that shown in FIG. 3A.
Figure 4B:
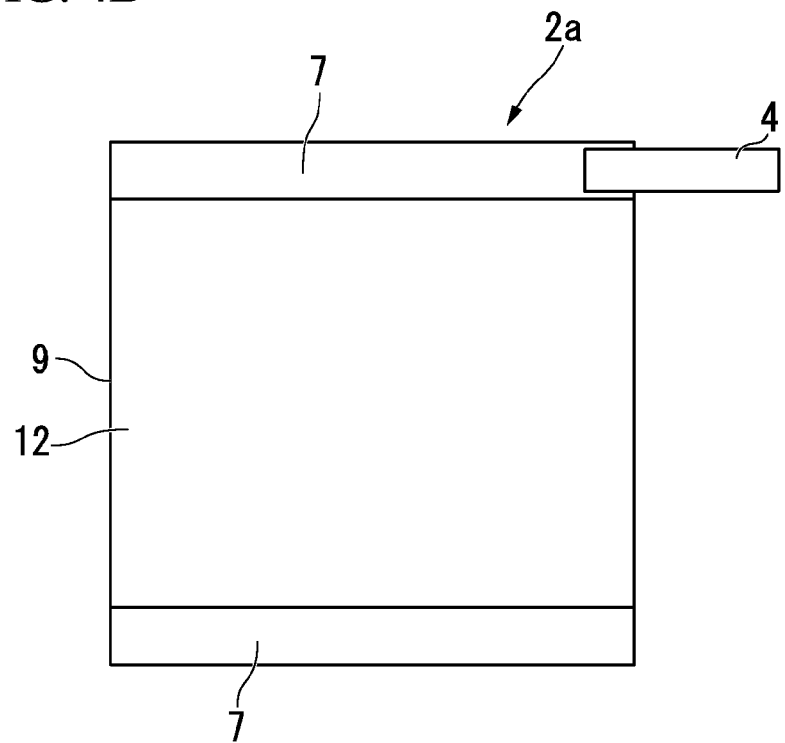
FIG. 4B is a schematic view explanatorily showing an embodiment of the method of the present invention for producing a laminate battery, and is a plan view showing a state wherein the direction of attachment of a terminal tab to the other one of the electrode plates of the membrane electrode assembly is changed from that shown in FIG. 3B.

In the positive electrode plate 2a and the negative electrode plate 3a of the embodiment shown in FIG. 3A and FIG. 3B, the terminal tabs 4, 5 are respectively joined to respective end portions 7, 11 of the current collectors 6, 9 in a direction orthogonal with the long sides of the end portions; however, the present invention is not limited to the example shown in the drawings. For example, as in the embodiment shown in FIG. 4A and FIG. 4B, the terminal tabs 4, 5 may be respectively joined to respective end portions 7, 11 of the current collectors 6, 9 of the positive electrode plate 2a and the negative electrode plate 3a such that the tabs protrude in the direction of the long sides of the end portions. Even when the construction as shown in FIG. 4A and FIG. 4B is employed, as in the case of using the positive electrode plate 2a and the negative electrode plate 3a shown in FIG. 3A and FIG. 3B, the lithium ion battery 1 may have a construction in which the membrane electrode assembly 10 is covered with the outer packaging material 15 as shown in FIG. 1 and FIG. 2.

<Method and Apparatus for Producing Lithium Ion Secondary Battery (Laminate Battery)>

Figure 5:
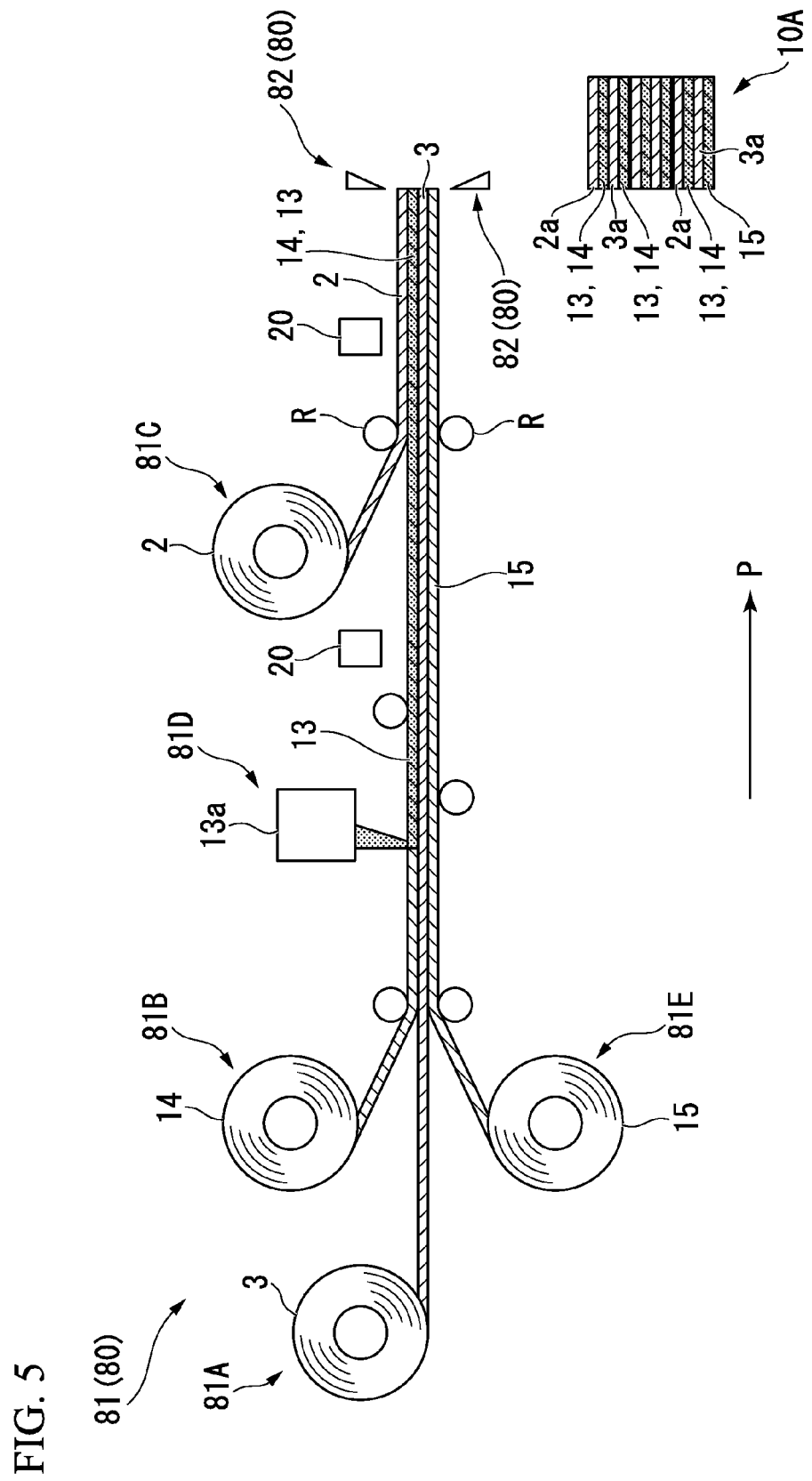
FIG. 5 is a schematic view explanatorily showing an embodiment of the method and apparatus of the present invention for producing a laminate battery, specifically showing a step and apparatus for laminating the negative electrode plate, the separator and the positive electrode plate which are strips wound into rolls and further laminating the gel electrolyte layer.
Figure 6A:
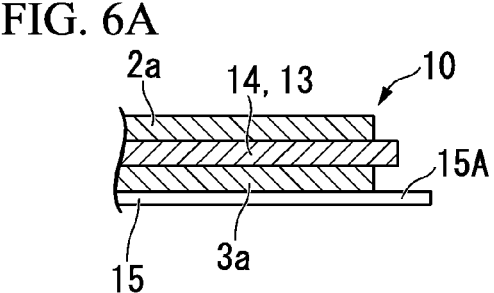
FIG. 6A is a schematic view showing the laminate in which the membrane electrode assembly is laminated on the outer packaging material.

Next, the method for producing a lithium ion secondary battery (laminate battery) 1 according to an embodiment of the present invention will be described referring when appropriate to FIG. 5 and FIG. 6A to FIG. 6D. Concerning the present embodiment, explanations are made on the case of producing a lithium ion secondary battery 1 using the apparatus of the present invention for producing a lithium ion secondary battery (laminate battery), which has mechanisms as shown in FIG. 5 to FIG. 7. In the following explanations, reference may be made when appropriate to the lithium ion secondary battery 1 obtained by the method and apparatus of this embodiment shown in FIG. 1 to FIG. 4, and the constructions thereof.

[Production Apparatus]

The apparatus 80 for producing the lithium ion secondary battery 1 to be described in this embodiment is an apparatus which forms a membrane electrode assembly 10 having a multi-layer structure in which the separator 14 and the gel electrolyte layer 13 are disposed between the positive electrode plate 2a and the negative electrode plate 3a, and covers the membrane electrode assembly 10 with the outer packaging material 15.

First, the apparatus 80 described in this embodiment has a lamination process unit (laminating means) 81 for forming the membrane electrode assembly 10 on the outer packaging material 15 by laminating the electrode plates 2, 3 through the separator 14 and the gel electrolyte layer 13, which comprises: a first roll mechanism 81A which feeds one electrode plate (negative electrode plate 3 in the drawing) selected from the positive electrode plate 2 and the negative electrode plate 3 which are strips wound into rolls onto the outer packaging material 15 such that the electrode plate extends on the outer packaging material 15; a second roll mechanism 81B which feeds the separator 14 which is a strip wound into a roll onto a surface of said one electrode plate (negative electrode plate 3) such that the separator 14 extends on said one electrode plate; and a third roll mechanism 81C which feeds another electrode plate (positive electrode plate 2 in the drawing) which is a strip wound into a roll onto a surface of the separator 14 such that said another electrode plate extends on the separator 14; and a coating mechanism 81D which applies a gel electrolyte 13a onto a surface of one of the strip-formed electrode plates (negative electrode plate 3), or a surface of the separator 14, such that a gel electrolyte layer 13 in a strip form is laminated in the resulting membrane electrode assembly 10. Further, in the apparatus 80 of the embodiment shown in FIG. 5, the outer packaging material 15 is, as in the case of the electrode plates 2 and 3 and the separator 14, provided in the form of a strip wound into a roll by the fourth roll mechanism 81E so as to be ready to be sequentially fed to the production steps. Further, in the example shown in FIG. 5, the apparatus has a construction in which the separator 14 is disposed between the outer packaging material 15 and the negative electrode plate 3.

Further, the apparatus 80 is provided with a dividing process unit (dividing means) 82 which cuts a strip-formed laminate of the outer packaging material 15 and the membrane electrode assembly 10, to thereby divide the laminate into pieces having an approximately rectangular shape as viewed in plan.

Figure 6B:
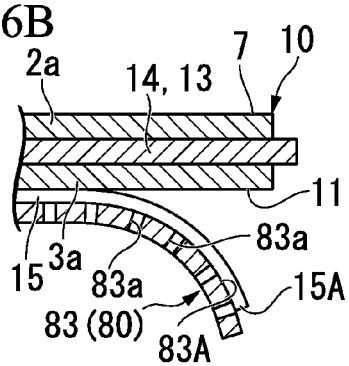
FIG. 6B is a schematic view showing the laminate being in a state wherein one of the lateral end portions of the outer packaging material of the laminate shown in FIG. 6A is adsorbed by the adsorption mechanism of the apparatus of the present invention so as to bend the lateral end portion in a direction opposite to the membrane electrode assembly.
Figure 6C:
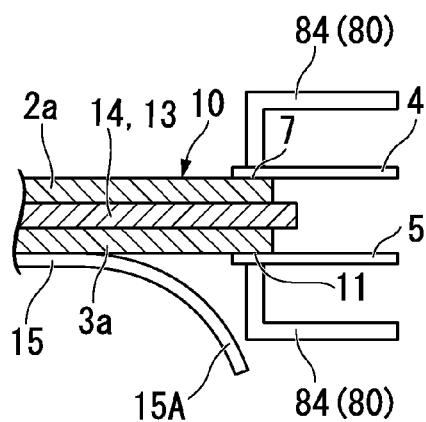
FIG. 6C is a schematic view showing the laminate being in a state wherein the terminal tabs are joined to the end portions of the positive electrode plate and the negative electrode plate of the membrane electrode assembly of the laminate shown in FIG. 6B by welding with the welding process unit of the apparatus of the present invention.
Figure 7:
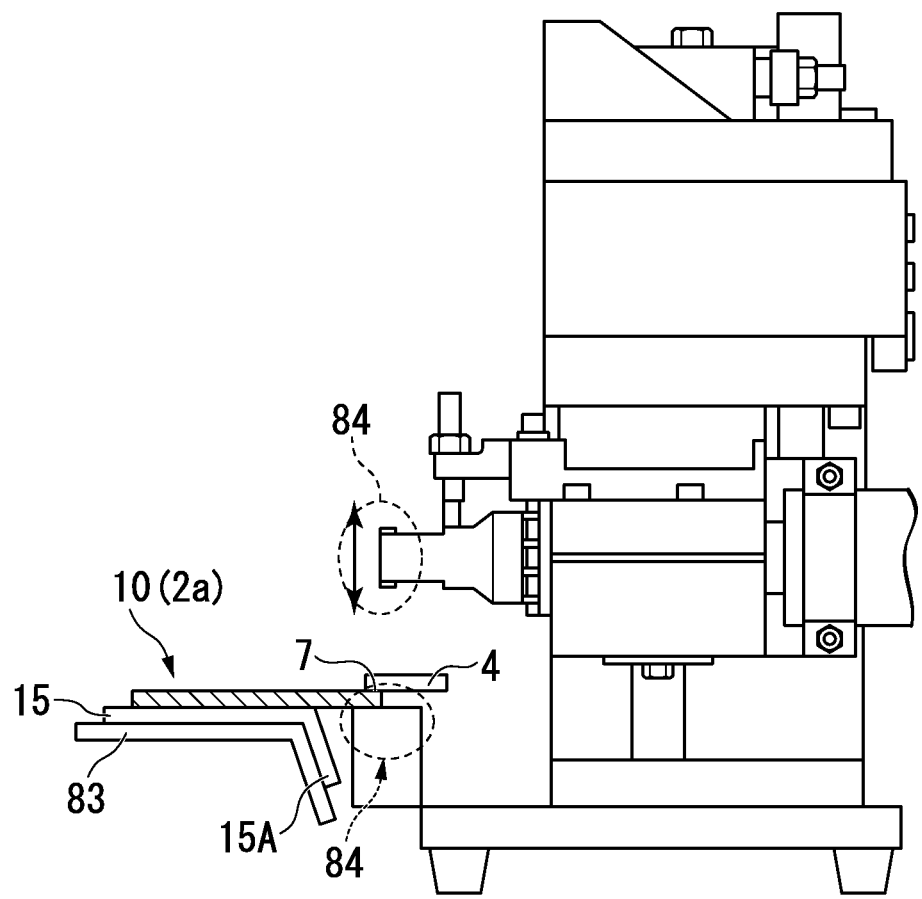
FIG. 7 is a schematic view explanatorily showing an embodiment of the method and apparatus of the present invention for producing a laminate battery, specifically showing an example of an apparatus for joining terminal tabs to the electrode plates of the membrane electrode assembly laminated on the outer packaging material.

The apparatus 80 of the present embodiment further comprises a bending process unit (bending means) 83 as shown in FIG. 6B which comprises an adsorption mechanism for adsorbing a lateral end portion of the outer packaging material 15, wherein the adsorption mechanism adsorbs the lateral end portion 15A of the outer packaging material 15 and bends the lateral end portion 15A in a direction opposite to the membrane electrode assembly 10, and a welding process unit (welding means) 84 as shown in FIG. 6C which joins the terminal tabs 4, 5 to the end portions 7, 11 of the positive electrode plate 2a and the negative electrode plate 3a by welding.

Figure 6D:
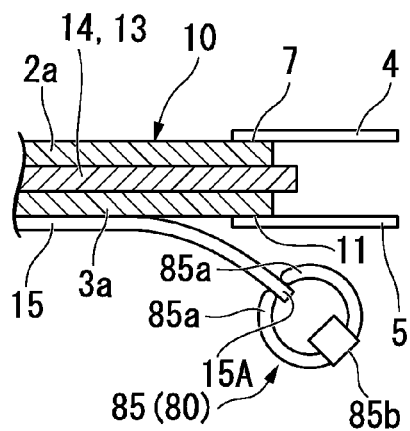
FIG. 6D is a schematic view showing the laminate being in a state wherein the bent end portion of the outer packaging material is bent back by the bend-back mechanism of the apparatus of the present invention.

The apparatus 80 according to this embodiment further comprises a laminate-seal process unit (laminate-sealing means) which comprises a bend-back mechanism 85 which, as shown in FIG. 6D, bends the end portion 15A of the outer packaging material 15 bent in a direction opposite to the membrane electrode assembly 10 back to the side of the membrane electrode assembly 10, and which, as shown in FIG. 2, packages the membrane electrode assembly 10 with the outer packaging material 15 with the terminal tabs 4, 5 protruding out of the outer packaging material 15 and seals the outer packaging material 15 at its outer periphery 15a.

The aforementioned bend-back mechanism 85 is provided for bending the end portion 15A of the outer packaging material 15 bent in a direction opposite to the membrane electrode assembly 10 back to the side of the membrane electrode assembly 10, prior to the laminate-seal treatment of the outer periphery 15a of the outer packaging material 15. As shown in FIG. 6D, the bend-back mechanism 85 is composed of a grip portion 85a which grips the end portion 15A of the outer packaging material 15 and bends it back, and a driving portion 85b composed of electromagnetic drive means or the like for implementing the gripping operation of the grip portion 85a.

As the bending process unit 83, for example, it is possible to employ a suction mechanism which can adsorb the end portion 15A of the outer packaging material 15 by a suction device (not shown) composed of a motor, blowing means or the like, and bend this end portion. Such a suction mechanism is not particularly limited, and may be, for example, a bending process unit 83 as shown in FIG. 6B, which is composed of a plate-like member having an arc-shaped cross-section, and has a plurality of through holes 83a. The bending process unit 83 in the example shown in the drawing is constructed such that, by sucking the outer packaging material 15 through a plurality of through-holes 83a with the suction device (not shown) to adsorb the end portion 15A on one surface 83A, this end portion 15A of the outer packaging material 15 can be bent forcibly.

As the welding process unit 84 provided in the apparatus 80 of the present embodiment, for example, any of ultrasonic welding means, resistance welding means and a laser welding means can be employed without any limitation. Among these, it is more preferable to employ ultrasonic welding means since the terminal tabs 4, 5 can be firmly bonded with the electrode plates 2a, 3a by using a small welding apparatus.

The welding by ultrasonic welding means is a solid phase welding, which enables a firm bond because even when the welding is performed with a foreign matter being adhered to the joint portion, the foreign matter is unlikely to form compounds or the like with a metal. In addition, there is only a small risk of rise of the electrical resistance due to the formation of carbides. (The "foreign matter" mentioned herein means an electrolytic solution, dust particles and the like.)

For carrying out the welding, it is preferable to perform a pretreatment such as heating of the tab portion in advance or removal of foreign matters from the tab portion. As a specific means of heating, irradiation with warm air, infrared ray or laser can be mentioned, whereby foreign matters can be easily removed by heating during the welding.

It is also possible to remove foreign matters by blowing air.

When the number of the electrodes is small, for example, about 10 sheets or less, the welding performed with foreign matters such as fine particles being present between the tabs is liable to cause breakage, tear, etc. of the welded parts of the tabs. As means for preventing such a problem, for example, it is possible to implement an adjustment such as lowering the set value of the pressure for welding or increasing the surface area of the anvil-horn for use in ultrasonic welding.

In the present embodiment, as the bending process unit 83 and the welding process unit 84 of the aforementioned the apparatus 80, those as illustrated in FIG. 7 can be used. FIG. 7 shows an apparatus constructed to be able to implement a process wherein the outer packaging material 15 and the membrane electrode assembly 10 are mounted with the outer packaging material 15 bent on the bending process unit 83, and the terminal tab 4 is welded to the positive electrode plate 2a by the welding process unit 84 comprised of an ultrasonic welding apparatus.

[Production Method]

The method of the present invention for producing a lithium ion secondary battery (laminate battery) 1 comprises a tab attachment step wherein each of the terminal tabs 4, 5 is joined by bending at least one end portion 15A of the outer packaging material 15 in a direction opposite to the membrane electrode assembly 10, and then joining the terminal tabs 4,5 to the positive electrode plate 2a and the negative electrode plate 3a at end portions 7, 11 thereof corresponding to the bent part of the end portion 15A of the outer packaging material 15.

With respect to the production method of this embodiment, before the tab attachment step (hereinafter, referred to as "(3) tab attachment step"), explanations are made on the method comprising the "(1) laminating step" and the subsequent "(2) dividing step" which are described below. That is, in the present embodiment, the method for producing a lithium ion secondary battery 1 comprises at least the following steps (1) to (3):

(1) a laminating step for forming the membrane electrode assembly 10, which comprises: feeding one electrode plate selected from the positive electrode plate 2 and the negative electrode plate 3 which are formed into strips onto the outer packaging material 15 such that the electrode plate extends on the outer packaging material 15; feeding the separator 14 which is formed into a strip onto a surface of said one electrode plate such that the separator 14 extends on said one electrode plate; and feeding another electrode plate onto the surface of the separator 14 such that said another electrode plate extends on the separator 14, thereby laminating the electrode plates 2, 3 through the separator 14, wherein a gel electrolyte 13a is applied onto a surface of one of the strip-formed positive electrode plate 2 and negative electrode plate 3, or a surface of the separator 14, such that gel electrolyte layer 13 in a strip form is laminated in the resulting membrane electrode assembly 10, (2) a dividing step comprising cutting a strip-formed laminate of the outer packaging material 15 and the membrane electrode assembly 10, to thereby divide the laminate into pieces having an approximately rectangular shape as viewed in plan, and (3) a tab attachment step wherein each of the terminal tabs 4, 5 is joined by bending one end portion 15A of the outer packaging material 15 in a direction opposite to the membrane electrode assembly 10, and then joining the terminal tabs 4, 5 to the positive electrode plate 2a and the negative electrode plate 3a at their end portions 7, 11 corresponding to the bent part of the end portion 15A of the outer packaging material 15.

Regarding the present embodiment, the positive electrode plate 2 and the negative electrode plate 3 are explained separately from the positive electrode plate 2a and the negative electrode plate 3a which are electrode plates after cutting (after division), using different reference numerals.

Hereinafter, the steps included in the production method of this embodiment are respectively described in detail.

(1) Laminating Step

In the laminating step, the strip-formed positive electrode plate 2, negative electrode plate 3, separator 14 and outer packaging material 15 which are prepared in advance are used. Further, in the laminating step, as the electrolyte used for forming the electrolyte layer 13, a previously prepared gel electrolyte 13a is used.

As the outer packaging material 15, for example, it is possible to use an aluminum foil or an aluminum laminate film which is a composite of an aluminum foil and a resin film, each being formed into a strip. As shown in the process diagram of FIG. 5, in the laminating step, the outer packaging material 15 is first fed so as to extend in this process and be placed as the lowermost layer. Because of this, when using a gel electrolyte 13a in the subsequent step, the gel electrolyte 13a can be prevented from leaking into the apparatus.

On the outer packaging material 15, first, the negative electrode plate 3 (one of the electrode plates) is fed to extend thereon.

As the negative electrode plate 3, a current collector 9 which is a copper foil or the like formed into a strip can be used. On both surfaces of the current collector 9, a strip-formed negative electrode plate 3 is formed by applying a negative electrode slurry to each surface of the current collector 9 except for the areas of the lateral end portions 11, 11, followed by drying to form a negative electrode active material layer 12. Such a negative electrode plate 3 in a strip form is, as shown in the process diagram of FIG. 5, wound into a roll in advance. In the example shown in the drawing, the negative electrode plate 3 is wound into a roll by the first roll mechanism 81A, being ready to be fed.

Then, a predetermined length of the negative electrode plate 3 formed as described above is fed to extend in the direction of the arrow P in FIG. 5.

The separator 14 is fed onto the surface of the negative electrode plate 3 so as to extend thereon.

As the separator 14, a non-woven fabric or the like formed into a strip can be used, and the separator 14 is wound into a roll in advance as shown in the process diagram of FIG. 5. In the example shown in the drawing, the separator 14 is wound into a roll by the second roll mechanism 81B, being ready to be fed.

The placement of the separator 14 may be carried out at any time before or after the formation of the electrolyte layer 13 to be described later.

Alternatively, it is also possible to obtain the membrane electrode assembly 10 while omitting the separator 14.

The electrolyte layer 13 is, as shown in the process diagram of FIG. 5, formed by applying a gel electrolyte 13a, at a side upstream of the starting point of feeding the positive electrode plate 2 to be described later, to the surface of the negative electrode plate 3 or the separator 14. After the application, the gel electrolyte 13a is cooled to form the electrolyte layer 13 laminated in the form of a strip. In this process, as described above, it is also possible to form a solid electrolyte layer by changing the composition of the gel electrolyte 13a in its preparation.

The positive electrode plate 2 (the other one of the electrode plates) is fed on the aforementioned separator 14 and electrolyte layer 13 so as to extend thereon.

As the positive electrode plate 2, a current collector 6 which is an aluminum foil or the like formed into a strip can be used. On both surfaces of the current collector 6, a strip-formed positive electrode plate 2 is formed by applying a positive electrode slurry to each surface of the current collector 6 except for the areas of the lateral end portions 7, 7, followed by drying to form a positive electrode active material layer 8. Such a positive electrode plate 2 in a strip form is, as shown in the process diagram of FIG. 5, wound into a roll in advance as in the case of the aforementioned negative electrode plate 3. In the example shown in the drawing, the positive electrode plate 2 is wound into a roll by the second roll mechanism 81B, being ready to be fed.

Then, as shown in FIG. 5, a predetermined length of the positive electrode plate 2 formed as described above is fed from a position downstream of the starting point of feeding the negative electrode plate 3 such that a predetermined length of the positive electrode 2 extends with its one surface facing a surface of the separator 14.

With respect to the aforementioned positive electrode plate 2 and negative electrode plate 3, it is preferred that these electrode plates are dried by fully evaporating the water before applying the gel electrolyte 13a so as to improve the coating performance of the gel electrolyte 13a.

Then, as shown in the process diagram of FIG. 5, the positive electrode plate 2 and the negative electrode plate 3, which are opposed to each other through the electrolyte layer 13 and the separator 14, are bonded together by being sandwiched between rollers R, R, thereby forming a laminate.

In the laminating step of the present embodiment, the formation of the electrolyte layer 13 may be carried out, for example, either by a method of preliminary heating the gel electrolyte 13a or a method of heating the electrolyte layer 13 during the lamination or after the coating.

According to the production method of this embodiment, the electrolyte layer can be efficiently formed with less labor and time, as compared to the conventional methods such as a method in which a membrane electrode assembly having a multilayer structure that is sealed in an outer casing is introduced into a vacuum atmosphere, and aged with an electrolyte solution injected between the positive and negative electrode plates.

Further, since the gel electrolyte 13a is applied on the surface of the extended strip-form negative electrode plate 3, it becomes possible to initiate the penetration of the gel electrolyte 13a into the positive electrode active material layer 8 and the negative electrode active material layer 12 at an early timing during the conveying of the positive electrode plate 2 and the negative electrode plate 3, whereby the time for producing the multi-layer membrane electrode assembly 10 can be shortened.

Furthermore, not only can the lamination of the positive electrode plate 2, the electrolyte layer 13, the separator 14 and the negative electrode plate 3 be carried out on the same line, but the cutting of the positive electrode plate 2, the separator 14 and the negative electrode plate 3 can be carried out simultaneously at a single position in the dividing step to be described later; therefore, the size of the production apparatus can be reduced, so that the installation space of the apparatus can be reduced.

Moreover, by applying the multi-layer membrane electrode assembly 10 having the gel electrolyte layer 13 in a laminate battery such as a lithium ion secondary battery, it becomes possible to produce a laminate battery which has an excellent lamination condition such that a liquid leak is unlikely to occur, while suppressing the production cost.

The membrane electrode assembly 10 provided in the lithium ion secondary battery 1 of the embodiment shown in FIG. 1, each of the electrode plates 2*a*, 3*a*, the separator 14 and the gel electrolyte layer 13 is provided in the form of one layer; however, for example, as in the multi-layer membrane electrode assembly 10A shown in FIG. 5, a plurality of the membrane electrode assemblies may be stacked together, which are obtained by cutting the strip-form negative electrode plate 3 and the strip-form positive electrode plate 2 at predetermined intervals. Further, for example, the membrane electrode assembly 10 may also have a structure in which the strip-form negative electrode plate 3 and the strip-form positive electrode plate 2 which are bonded together are wound such that the positive electrode plate 2 is positioned inwardly. The production method according to the present invention encompasses the case where a plurality of the membrane electrode assemblies 10 are stacked together as shown in FIG. 5. In this case, for example, a multi-layer electrode assembly may be formed by laminating 9 layers of the positive electrode plate 2 and 10 layers of the negative electrode plate 3 such that both outermost layers are the negative electrode plate 3. Even in the case of production of a lithium ion secondary battery containing the membrane electrode assembly having such a structure, it is possible to apply the tab attachment step according to the present invention which will be described later in detail without any limitation.

In the aforementioned laminating step, the gel electrolyte 13*a* for forming the electrolyte layer 13 may be, for example, applied to the surface of either one of the negative electrode plate 3 and the positive electrode plate 2, or to the surfaces of both of the negative electrode plate 3 and the positive electrode plate 2.

So far, the laminating step has been explained referring to an example where the negative electrode plate 3 is first laminated on the outer packaging material 15, whereupon the separator 14 and the positive electrode plate 2 are sequentially laminated; however, the present invention is not limited to this example. For example, it is possible to employ a method in which the positive electrode plate 2 is first laminated on the outer packaging material 15, whereupon the separator 14 and the negative electrode plate 3 are sequentially laminated, as long as the positive electrode active material layer 8 does constitute the bottom surface (at the lowermost layer) or the top surface (at the uppermost layer) of the multi-layer membrane electrode assembly 10 so as to prevent occurrence of dendrite.

Further, it is also possible to employ a step wherein the negative electrode plate 3 and the positive electrode plate 2 are transferred horizontally to be brought into contact and bonded together, as long as it is possible to appropriately laminate the negative electrode plate 3 and the positive electrode plate 2 through the electrolyte layer 13 and the separator 14.

(2) Dividing Step

Next, in the dividing step, the strip-form laminate of the outer packaging material 15 and the membrane electrode assembly 10 is cut, to thereby divide the laminate into pieces having an approximately rectangular shape as viewed in plan.

Specifically, using a dividing process unit (dividing means) 82 composed of a cutting mechanism having a blade-like member as shown in the process diagram of FIG. 5, the outer packaging material 15 together with the positive electrode plate 2, the electrolyte layer 13, the separator 14 and the negative electrode plate 3 which are laminated on the outer packaging material are cut at predetermined intervals in a direction orthogonal to the direction of the arrow P shown in FIG. 5 (in the depth direction of the drawing). As a result, the positive electrode plate 2*a* is disposed on the negative electrode plate 3*a* while the gel electrolyte layer 13 and the separator 14 are disposed between the positive electrode plate 2*a* and the negative electrode plate 3*a*, thereby obtaining a membrane electrode assembly in the form of a sheet having an approximately rectangular shape as viewed in plan.

Then, as shown in FIG. 5, if necessary, a plurality of such membrane electrode assemblies may be stacked to form a multi-layer membrane electrode assembly 10.

In the multi-layer membrane electrode assembly 10, it is preferred that the negative electrode plate 3*a* is positioned at each of the lowermost layer and the uppermost layer. By forming the multi-layer membrane electrode assembly 10 with such arrangement of the components, the generation of dendritic deposits of lithium (dendrite) which may occur when the positive electrode plate 2*a* is positioned at the outermost layer can be prevented, so that defects such as short-circuit can be avoided.

Here, the aforementioned dendrite is likely to occur when the positive electrode plate 2*a* is located at the outermost layer of the multi-layer membrane electrode assembly 10, and the active material layer 8 is formed on the outward-facing surface of the positive electrode plate 2*a* (that is, the surface that does not face the negative electrode plate 3*a*).

Therefore, even when the numbers of the positive electrode plate 2*a* and the negative electrode plate 3*a* of the multi-layer membrane electrode assembly 10 are not adjusted, and the positive electrode plate 2*a* is disposed at the outermost layer, the occurrence of dendrite and the associated defects such as short-circuit can be prevented by employing a structure wherein the positive electrode active material layer 8 is not formed on the outward-facing surface of the positive electrode plate 2*a* located at the outermost layer of the multi-layer membrane electrode assembly 10.

In the production method of this embodiment, by employing the aforementioned method comprising the laminating step and the dividing step, the multi-layer membrane electrode assembly 10 can be produced continuously while conveying the strip-form positive electrode plate 2 and the strip-form negative electrode plate 3 in a direction of the arrow P.

(3) Tab Attachment Step

Next, the tab attachment step in the production method of the present invention will be described with reference to FIG. 6A to FIG. 6C.

The tab attachment step of the present embodiment can be implemented using the production apparatus 80 described above. First, with respect to a laminate as shown in FIG. 6A which is composed of the membrane electrode assembly 10 laminated on the outer packaging material 15, one end portion 15A of the outer packaging material 15 is bent in a direction opposite to the membrane electrode assembly 10 using the bending process unit 83 as shown in FIG. 6B. In this case, as shown in FIG. 6B etc., it is preferred that one end portion 15A of the outer packaging material 15 is bent so as to draw a smooth arc, because the outer packaging material 15 made of aluminum or the like would not suffer wrinkles, cracks or the like. By bending the end portion 15A of the outer packaging material 15 into the aforementioned shape, the excellent seal can be achieved in the lithium ion secondary battery 1 obtained in the subsequent laminate-sealing step in which the membrane electrode assembly 10 is packaged in the outer packaging material 15, and the obtained lithium ion secondary battery 1 also has excellent appearance.

Then, as shown in FIG. 6C, using the welding process unit 84, the terminal tabs 4, 5 are respectively joined to respective end portions 7, 11 of the positive electrode plate 2a and the negative electrode plate 3a, wherein the end portions 7, 11 are disposed at positions corresponding to the end portion 15A of the outer packaging material 15. Specifically, as shown in FIG. 6C, the welding is performed while the positive electrode plate 2a and the terminal tab 4 are sandwiched between the welding process units 84, 84 through the negative electrode plate 3a, the separator 14 and the gel electrolyte layer 13 being provided below the positive electrode plate 2a and the terminal tab 4, wherein the welding process units 84, 84 are composed of welding electrodes and are respectively disposed at upper and lower positions. Similarly, the negative electrode plate 3a and the terminal tab 5 are sandwiched between the welding process units 84, 84 (respectively disposed at upper and lower positions) through the separator 14, the gel electrolyte layer 13 and the positive electrode plate 2a being provided above the negative electrode plate 3a and the terminal tab 5, to thereby perform welding.

FIG. 6A is a side view showing an example in which the welding process units 84 are arranged in series at two locations with respect to the direction of the progress of the process. Thus, it is more preferred to provide the welding process unit 84 at two locations because the welding can be performed simultaneously at distant locations as view in plan with respect to the joining of the terminal tab 5 to the negative electrode plate 3a shown in FIG. 3A and FIG. 4A and the joining of the terminal tab 4 to the positive electrode plate 2a as shown in FIG. 3B and FIG. 4B.

In the tab attachment step of the present embodiment, since the terminal tabs 4, 5 are joined to the end portions 7, 11 of the electrode plates 2a, 3a with the outer packaging material 15 being bent in advance in a direction opposite to the membrane electrode assembly 10, the terminal tabs 4, 5 can be easily joined to the electrode plates 2a,3a without occurrence of through-holes in the outer packaging material 15 with simple procedure.

With respect to the degree of bending of the end portion 15A of the outer packaging material 15 in the tab attachment step, there is no particular limitation as long as a sufficient space is secured for welding the terminal tabs 4, 5 to the end portions 7, 11 of the electrode plates 2a, 3a. For example, the bending may be done such that the distance from the tab 5 to the end portion 15A becomes preferably from 1 mm to 10 cm, more preferably 2 mm to 6 cm, particularly preferably 3 mm to 2 cm.

Further, as explained above in connection with the production apparatus 80, the joining of the terminal tabs 4, 5 to the end portions 7, 11 of the positive electrode plate 2a and the negative electrode plate 3a can be performed by a method selected from the group consisting of ultrasonic welding, resistance welding and laser welding, of which the ultrasonic welding is preferred.

Further, in the present embodiment, the outer packaging material 15 is preferably made of aluminum. By using the outer packaging material 15 made of aluminum, the bending of the end portion 15A of the outer packaging material 15 in the tab attachment step and the bending back of the end portion 15A in the subsequent laminate-sealing step can be performed without occurrence of large wrinkles or the like in the outer packaging material 15, and the effect of improving processability can also be achieved. Furthermore, in the laminate-sealing step described below, the processability is remarkably improved also at the time of packaging the membrane electrode assembly 10 with the outer packaging material 15 with the terminal tabs 4, 5 protruding outwardly and sealing at the outer periphery 15a.

(4) Laminate-Sealing Step

Then, in the laminate-sealing step performed subsequent to the aforementioned tab attaching step, the membrane electrode assembly 10 is packaged with the outer packaging material 15, and the outer packaging material 15 is sealed at its outer periphery 15a.

Specifically, by bending the end portion 15A of the outer packaging material 15 bent in a direction opposite to the membrane electrode assembly 10 back to the side of the membrane electrode assembly 10, the outer packaging material 15 is returned to an approximately plate-like shape. Here, for example, as shown in FIG. 6D, by using a bend-back mechanism 85 which grips the end portion 15A of the outer packaging material 15 and bends it back, the end portion 15A of the outer packaging material 15 is gripped by the grip portion 85a and bent back to the side of the membrane electrode assembly 10.

Then, the membrane electrode assembly 10 is packaged with the outer packaging material 15 with the terminal tabs 4, 5 protruding outwardly, and the outer packaging material 15 is sealed at its outer periphery 15a (see FIG. 1 and FIG. 2). As a method for sealing at the outer periphery 15a of the outer packaging material, any conventionally known methods can be adopted without any limitation.

Thus, it is possible to produce a lithium ion secondary battery 1 which is a laminate battery comprising a multi-layer membrane electrode assembly 10 packaged with the outer packaging material 15.

<Effects>

According to the method and apparatus of the present invention for producing a lithium ion secondary battery (laminate battery) 1, as mentioned above, the terminal tabs 4, 5 are joined to the end portions 7, 11 of the positive electrode plate 2a and the negative electrode plate 3a with the outer packaging material 15 being bent in advance in a direction opposite to the membrane electrode assembly 10; therefore, in the production of a lithium ion secondary battery 1 by covering the membrane electrode assembly 10 including the electrolyte layer 13 formed in advance with the outer packaging material 15, the terminal tabs 4, 5 can be easily joined to the positive electrode plate 2a and the negative electrode plate 3a included in the membrane electrode assembly 10 placed on the outer packaging material 15 without occurrence of through-holes in the outer packaging material 15. Thus, it becomes possible to continuously produce a lithium ion secondary battery 1; therefore, the present invention has excellent effect that a lithium ion secondary battery 1 having excellent characteristics can be produced with high productivity.

DESCRIPTION OF THE REFERENCE SIGNS

1 Lithium-ion secondary battery (laminate battery)
2 Positive electrode plate (electrode plate)
2a Positive electrode plate (positive electrode plate after cutting: electrode plate)
3 Negative electrode plate (electrode plate)
3a Negative electrode plate (negative electrode plate after cutting: electrode plate)
4, 5 Terminal tabs
6 Current collector (positive electrode plate)
7 End portion (positive electrode plate)
8 Positive electrode active material layer
9 Current collector (negative electrode plate)
10, 10A Membrane electrode assembly
11 End portion (negative electrode plate)
12 Negative electrode active material layer
13 Gel electrolyte layer
13a Gel electrolyte
14 Separator
15 Outer packaging material
15A End portion
15a Outer periphery
80 Apparatus for producing a lithium ion secondary battery (laminate battery)
81 Lamination process unit (laminating means)
81A First roll mechanism
81B Second roll mechanism
81C Third roll mechanism
81D Coating mechanism
81E Fourth roll mechanism
82 Dividing process unit (dividing means)
83 Bending process unit (bending means)
84 Welding process unit (welding means)
85 Bend-back mechanism (laminating means)
85a Grip portion
85b Driving portion

The invention claimed is:

1. A method for producing a laminate battery, comprising:
a step of forming a membrane electrode assembly having a multilayer structure comprising a positive electrode plate, a negative electrode plate and an electrolyte layer, the electrolyte layer being provided between the positive electrode plate and the negative electrode plate,
a tab attachment step comprising joining terminal tabs to end portions of the positive electrode plate and the negative electrode plate of the membrane electrode assembly on an outer packaging material, and
a step of covering the membrane electrode assembly with the outer packaging material,
wherein each of the terminal tabs is joined by bending at least a part of the end portion of the outer packaging material in a direction opposite to the membrane electrode assembly, and then joining the terminal tab to the positive electrode plate or the negative electrode plate at a portion thereof corresponding to the bent part of the end portion of the outer packaging material.

2. The method for producing a laminate battery according to claim 1, wherein the membrane electrode assembly further comprises a separator provided between the positive electrode plate and the negative electrode plate, the electrolyte layer is in the form of a gel, and the joining of the terminal tabs is performed by welding.

3. The method for producing a laminate battery according to claim 2, which further comprises the following steps prior to the tab attachment step:

a laminating step for forming the membrane electrode assembly, which comprises: feeding one electrode plate selected from the positive electrode plate and the negative electrode plate which are formed into strips onto the outer packaging material such that the electrode plate extends on the outer packaging material; feeding the separator which is formed into a strip onto a surface of said one electrode plate such that the separator extends on said one electrode plate; and feeding another electrode plate onto the surface of the separator such that said another electrode plate extends on the separator, to thereby laminate the electrode plates through the separator, wherein a gel electrolyte is applied onto a surface of one of the positive electrode plate and the negative electrode plate, or a surface of the separator, such that gel electrolyte layer in a strip form is laminated in the resulting membrane electrode assembly, and a subsequent dividing step comprising cutting a strip-form laminate of the outer packaging material and the membrane electrode assembly, to thereby divide the laminate into pieces having an approximately rectangular shape as viewed in plan.

4. The method according to claim 1, which further comprises a laminate-sealing step subsequent to the tab attachment step, the laminate-sealing step comprising bending the bent part of the end portion of the outer packaging material back to the side of the membrane electrode assembly; packaging the membrane electrode assembly with the outer packaging material with the terminal tabs protruding out of the outer packaging material; and sealing the outer packaging material at its outer periphery.

5. The method according to claim 1, wherein, in the tab attachment step, the joining of the terminal tabs to the end portions of the positive electrode plate and the negative electrode plate is performed by a method selected from the group consisting of ultrasonic welding, resistance welding and laser welding.

6. The method according to claim 1, wherein, in the tab attachment step, the terminal tabs are contacted with and joined to the end portions of the positive electrode plate and the negative electrode plate in the presence of an electrolyte between the terminal tabs and the end portions of the positive electrode plate and the negative electrode plate.

7. The method according to claim 1, wherein the outer packaging material is made of aluminum or a stainless steel.

8. An apparatus for producing a laminate battery comprising a membrane electrode assembly having a multilayer structure with a separator and a gel electrolyte layer which are disposed between a positive electrode plate and a negative electrode plate, the membrane electrode assembly being covered with an outer packaging material from which protrude terminal tabs joined with the positive electrode plate and the negative electrode plate, said apparatus comprising:

a laminating means for forming the membrane electrode assembly on the outer packaging material by laminating the electrode plates through the separator and the gel electrolyte layer, which comprises: a first roll mechanism which feeds one electrode plate selected from the positive electrode plate and the negative electrode plate which are strips wound into rolls onto the outer packaging material such that the electrode plate extends on the outer packaging material; a second roll mechanism which feeds the separator which is a strip wound into a roll onto a surface of said one electrode plate such that the separator extends on said one electrode plate; and a third roll mechanism which feeds another electrode plate which is a strip wound into a roll onto a surface of the separator such that said another electrode plate extends on the separator; and a coating mechanism which applies a gel electrolyte onto a surface of one of the positive electrode plate and the negative electrode plate, or a surface of the separator, such that a gel electrolyte layer in a strip form is laminated in the resulting membrane electrode assembly, a dividing means which cuts a strip-form laminate of the outer packaging material and the membrane electrode assembly, to thereby divide the laminate into pieces having an approximately rectangular shape as viewed in plan, a bending means comprising an adsorption mechanism for adsorbing a lateral end portion of the outer packaging material, which adsorbs the lateral end portion of the outer packaging material and bends the lateral end portion in a direction opposite to the membrane electrode assembly, and a welding means which joins terminal tabs to end portions of the positive electrode plate and the negative electrode plate by welding.

9. The apparatus according to claim 8, which further comprises a laminate-sealing means comprising a bend-back mechanism which bends the lateral end portion of the outer packaging material bent in a direction opposite to the membrane electrode assembly back to the side of the membrane electrode assembly, and which packages the membrane electrode assembly with the outer packaging material with the terminal tabs protruding out of the outer packaging material and seals the outer packaging material at its outer periphery.

10. The apparatus according to claim 8, wherein the welding means is selected from the group consisting of a ultrasonic welding means, a resistance welding means and a laser welding means.

11. A laminate battery which is produced by the method according to claim 1.

* * * * *